US012689657B2

(12) United States Patent
Gabrys et al.

(10) Patent No.: US 12,689,657 B2
(45) Date of Patent: Jul. 21, 2026

(54) ADAPTIVE DYNAMIC NETWORK DECOY SYSTEM

(71) Applicant: The United States of America, as represented by the Secretary of the Navy, Arlington, VA (US)

(72) Inventors: Ryan Christopher Gabrys, San Diego, CA (US); Daniel Silva, El Cajon, CA (US); Braulio Ivan Coronado, Winchester, CA (US); Mark Bilinski, Vista, CA (US); Rucha Kolhatkar, Irvine, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 168 days.

(21) Appl. No.: 18/805,818

(22) Filed: Aug. 15, 2024

(65) Prior Publication Data

US 2026/0012485 A1 Jan. 8, 2026

Related U.S. Application Data

(60) Provisional application No. 63/667,513, filed on Jul. 3, 2024.

(51) Int. Cl.
*H04L 9/40* (2022.01)
(52) U.S. Cl.
CPC ................................ *H04L 63/1491* (2013.01)
(58) Field of Classification Search
CPC .................................................. H04L 63/1491
See application file for complete search history.

(56) References Cited

U.S. PATENT DOCUMENTS

| | | | |
|---|---|---|---|
| 2008/0141374 A1* | 6/2008 | Sidiroglou ............ | G06F 21/554 |
| | | | 726/23 |
| 2021/0185087 A1* | 6/2021 | Wu ........................ | H04L 43/08 |

(Continued)

FOREIGN PATENT DOCUMENTS

| | | | | |
|---|---|---|---|---|
| CN | 115392323 A | * | 11/2022 | .......... G01M 13/045 |
| CN | 117040871 A | * | 11/2023 | ......... H04L 63/1433 |

(Continued)

OTHER PUBLICATIONS

Alohaly, Manar et al. "Integrating Cyber Deception into Attribute-based Access Control (ABAC) for Insider Threat Detection." IEEE Access (2022).

(Continued)

*Primary Examiner* — Meng Li
(74) *Attorney, Agent, or Firm* — Naval Information Warfare Center, Pacific; Kyle Eppele; Andrew J. Cameron

(57) ABSTRACT

A method of maintaining a pool of network decoys includes evolving, over a plurality of epochs, the pool of network decoys towards one or more preferences of a network attacker. The method includes modeling preferences of the network attacker based on monitored interactions between the network attacker and the pool of network decoys to generate a preference model of the network attacker. Each epoch includes updating a fitness function based on the preference model and applying the fitness function to each network decoy included in the pool of network decoys to determine a plurality of fitness values, where the fitness values are representative of an attractiveness of a respective network decoy to the network attacker. The pool of network decoys is then updated based on the fitness values.

20 Claims, 9 Drawing Sheets

(56)              References Cited

U.S. PATENT DOCUMENTS

| | | | |
|---|---|---|---|
| 2023/0370439 A1* | 11/2023 | Crabtree | ............. H04L 63/0428 |
| 2026/0006077 A1* | 1/2026 | Bilinski | .............. H04L 63/1491 |

FOREIGN PATENT DOCUMENTS

| | | | | |
|---|---|---|---|---|
| CN | 117411670 A | * | 1/2024 | ......... H04L 63/1491 |
| CN | 115460002 B | * | 7/2024 | ........... H04L 63/205 |

OTHER PUBLICATIONS

Cho Jin-Hee et al. "Toward proactive, adaptive defense: a survey on moving target defense." IEEE Communications Surveys & Tutorials 22.1 (2020): 709-745.
Islam, Md Mazharul et al. "Active deception framework: an extensible development environment for adaptive cyber deception." 2020 IEEE Secure Development (SecDev). IEEE, 2020.

* cited by examiner

600

602
SELECT AT LEAST TWO NETWORK DECOYS FROM POOL

604
GENERATE NEW NETWORK DECOY

606
ADD NEW NETWORK DECOY TO POOL

ADAPTIVE DYNAMIC NETWORK DECOY SYSTEM

REFERENCE TO RELATED APPLICATIONS

This application claims priority to U.S. provisional Application No. 63/667,513 filed Jul. 3, 2024, which is hereby incorporated by reference.

FEDERALLY-SPONSORED RESEARCH AND DEVELOPMENT

The United States Government has ownership rights in one or more inventions provided in this disclosure. Licensing inquiries may be directed to Office of Research and Technical Applications, Naval Information Warfare Center Pacific, Code 72110, San Diego, CA, 92152; (619) 553-5118; NIWC_Pacific_T2@us.navy.mil. Reference Navy Case No. 211366.

TECHNICAL FIELD

Aspects of the present disclosure relate generally to network security, and in particular but not exclusively, relate to network security systems that utilize the deployment of network-accessible decoys.

BACKGROUND OF THE INVENTION

Network security includes deploying or implementing policies, processes, and practices with the ultimate goal of preventing, detecting, or monitoring unauthorized access or use of a computer network. A number of tools and techniques may be deployed in the defense of a network, but they are typically at a disadvantage due to the attacker having control of the time, the location, and the manner of the attack.

One tool that may be deployed in a network security environment is a network decoy, often referred to as a honeypot. A network decoy may be deployed on a network as a virtual device, service, or other network-accessible resource. The network decoy may appear as a legitimate target to a would-be attacker, but in reality is deployed on the network in order to enable the gathering of information about the attacker and/or to provide early-warning detection of the attack. The techniques that are used by the attacker in their attempt to compromise the network decoy may be analyzed during or after the attempt to learn more about the identity of attacker and/or to learn of newly adopted exploitation techniques. Such analysis may then be used to further improve the security of the network. A network decoy can also direct an attacker's attention away from legitimate network devices because the network decoy may encourage an attacker to spend their time and energy on the decoy while distracting their attention from real, legitimate network devices.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a device, method, and computer-readable media for implementing an adaptive dynamic network decoy system are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned above, a network decoy is a tool that may be deployed in the defense of a computer network. However, existing implementations of network decoys can often be limited, as an attacker may detect the presence of the network decoy, rendering the network decoy as "stale" and thus ineffective. In addition, existing network decoys may present themselves as a network device, service, or resource that is just not attractive to a would-be attacker further limiting the usefulness of the decoy.

In some systems, the periodic or regular changing of network decoys may be utilized to combat against network decoys becoming stale. However, simply alternating between libraries of predetermined decoys may not be effective and may still become stale as attackers become more and more sophisticated allowing the attacker to eventually identify the ruse.

Accordingly, aspects of the present disclosure provide a method of maintaining a pool of dynamic and adaptive network decoys. For example, in some aspects, the pool of network decoys is dynamically updated to continuously present new network decoys on the network. In addition to dynamically creating new network decoys, the pool of network decoys may be adapted to preferences of the network attacker. For example, aspects of the present disclosure may include monitoring the network for interactions between the network attacker and the pool of network decoys to learn the attacker's preferences. Then, utilizing these learned preferences, network decoys may be created and added to the pool of network decoys that display features or aspects that are increasingly more and more attractive to the particular network attacker. These and other aspects of the present disclosure will be described in more detail below.

Figure 1:
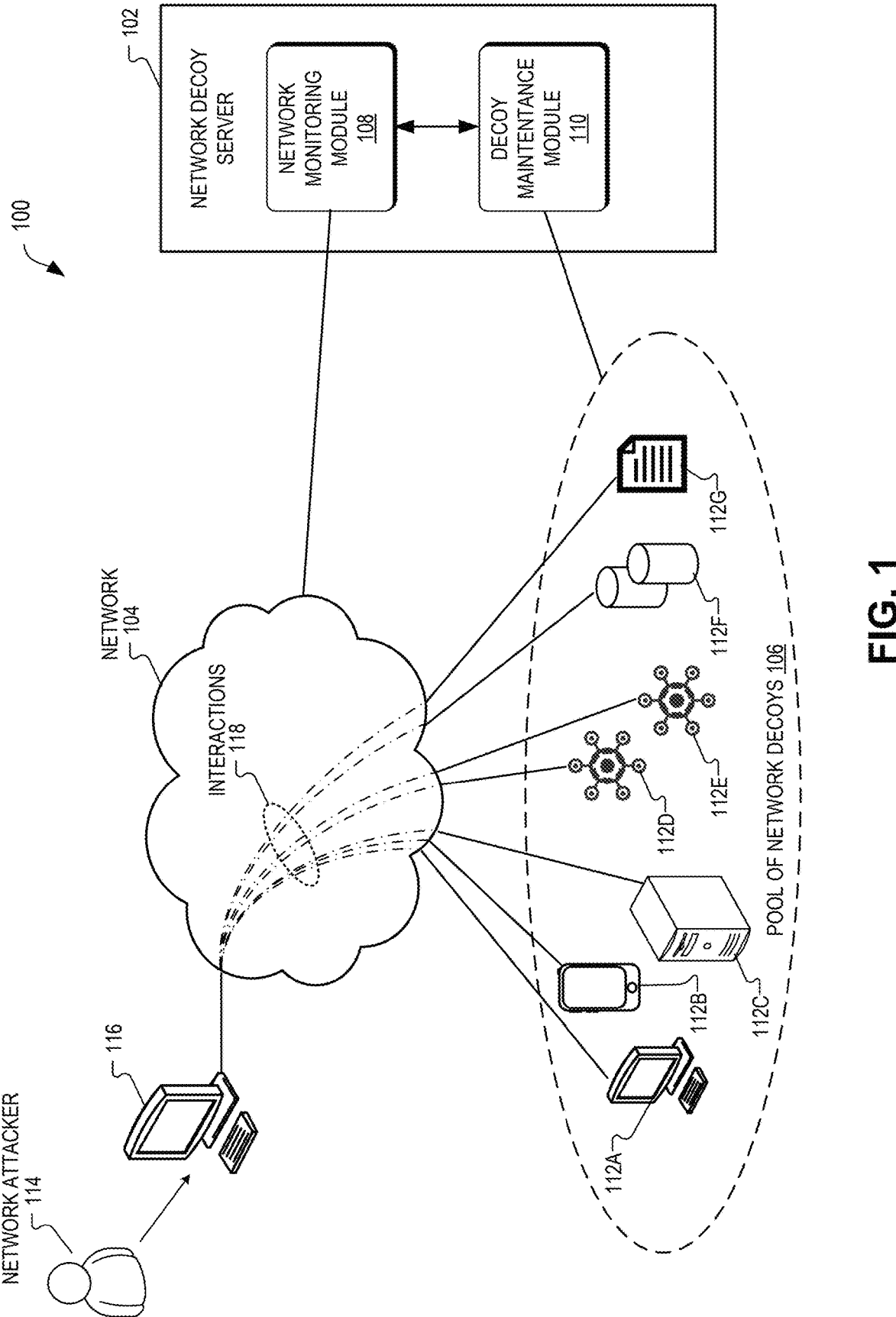
FIG. 1 illustrates an example architecture of a network system, in accordance with aspects of the disclosure.

FIG. 1 illustrates an example architecture of a network system 100, in accordance with aspects of the disclosure. Network system 100 is shown as including a network decoy server 102, a network 104, and a pool of network decoys 106. Network decoy server 102 is shown as including a network monitoring module 108 and a decoy maintenance module 110. FIG. 1 also illustrates the pool of network decoys 106 as including network decoys 112A-112G. Also shown in FIG. 1 are a network attacker 114, a computing device 116, and interactions 118.

In some aspects, network 104 includes a number of routing agents and processing agents. The network 104 may be a local or global system of interconnected computers and computer networks that uses a common communication protocol over digital interconnections. For example, network 104 may utilize an Internet protocol suite (e.g., the Transmission Control Protocol (TCP) and IP) for communication among disparate devices and networks.

FIG. 1 illustrates network attacker 114 as utilizing a computing device 116 to access one or more other network devices, services, or resources on network 104. In some aspects, network attacker 114 is a human operator or a group of human operators directing computing device 116. In other aspects, network attacker 114 may be software, a bot, or other autonomous software operating on computing device 116.

In FIG. 1, computing device 116 is shown as connecting to the network 104 directly (e.g., over an Ethernet connection or Wi-Fi or 802.11-based network) or via another intermediate network (e.g., the Internet). The computing device 116 may have a wired or wireless connection to the network 104, such as a direct connection to a modem or router (e.g., a Wi-Fi router with both wired and wireless connectivity). Although illustrated as a desktop computer, computing device 116 may be a laptop computer, a tablet computer, a PDA, a smart phone, or the like. In other examples, computing device 116 may be connected to network 104 via an optical communication system, a cable modem, a digital subscriber line (DSL) modem, or the like. The computing device 116 may be configured to communicate over a physical communications interface or layer with one or more other devices on network 104 using one or more standard Internet protocols (e.g., TCP/IP).

In the illustrated example of FIG. 1, network attacker 114 has already been identified and/or tagged as a potential or known attacker or at least has been identified as a suspicious entity on network 104. In some examples, network decoy server 102 is configured to identify network attacker 114 as a network attacker or suspicious entity. In other examples, a separate cyber monitor and/or analytics tool (not show in FIG. 1) may be used in conjunction with network decoy server 102 to identify the presence of network attacker 114 on network 104. Identification of network attacker 114 as a network attacker or suspicious entity may be implemented in a variety of ways, such as by identifying uncommon network activity by network attacker 114, identifying network performance issues on network 104, discovering active network connections and determining their validity and connection status, utilizing historical threat intelligence and analytics, and so on.

FIG. 1 further illustrates a pool of network decoys 106 deployed on network 104 by the network decoy server 102. The illustrated example of the pool of network decoys 106 includes several network decoys 112A-112G. However, the pool of network decoys 106 may include any number of network decoys including one or more. The example network decoys 112A-112C are shown as network devices (e.g., a computing device, a smart phone, a server, respectively); network decoys 112D-112E are shown as network services (e.g., directory services, Domain Name Systems, e-mail, etc.); and network decoys 112F-112G are shown as network resources (e.g., database, storage device, shared files, etc.).

As mentioned above, network decoys 112A-112G are virtual devices, services, and resources deployed on network 104 to appear as legitimate targets to network attacker 114, but in reality are part of a cyber-defense system used to aid in the monitoring and/or countering against network attacks. In the illustrated example, network decoy server 102 is configured to deploy (i.e., instantiate, host, operate, etc.) the network decoys 112A-112G on network 104. Network decoy server 102 is shown as being connected to the network 104, and may, in some examples, be implemented as a plurality of structurally separate servers, or alternately may correspond to a single server.

Network decoy server 102 is shown as including a network monitoring module 108 and a decoy maintenance module 110, which together may operate to maintain the pool of network decoys 106. The network monitoring module 108 and the decoy maintenance module 110 may each include routines, program instructions, objects, and/or data structures that perform particular tasks or implement particular abstract data types, as described herein.

For example, as will be described in more detail below, the network monitoring module 108 may be configured to monitor the network 104 for interactions 118 between the network attacker 114 and the pool of network decoys 106. In some aspects, an interaction 118 is any request, response, or other sequence of related network traffic on network 104 that is caused by actions of the network attacker 114 via computing device 116. Monitoring for interactions 118 may include determining which and/or the number of instances that network decoys 112A-112G were interacted with by the network attacker 114. Monitoring for interactions 118 may also include determining various metrics regarding how the network attacker 114 interacted with a network decoy, such as how long the network decoy was accessed, the time since the network decoy was last interacted with by the network attacker 114, which services were accessed by the network attacker 114, a total number of different services accessed by the network attacker 114, and so on.

The decoy maintenance module 110 is configured to maintain the pool of network decoys 106. In some aspects, maintaining the pool of network decoys 106 includes adding or deleting network decoys to/from the pool of network decoys 106. In another example, maintaining the pool of network decoys 106 includes dynamically creating new network decoys and adding them to the pool. In yet another example, maintaining the pool of network decoys 106 includes changing one or more configurations of an existing network decoy included in the pool. As stated above, dynamically adding, removing, changing, and/or creating the network decoys included in the pool of network decoys 106 may help prevent the network decoys from becoming stale.

In addition to dynamically updating the pool of network decoys 106, the decoy maintenance module 110 may be configured to adapt the pool of network decoys 106 towards one or more preferences of the network attacker 114. For example, in some instances the decoy maintenance module 110 may determine preferences of the network attacker 114 based on the interactions 118 that are monitored by the network monitoring module 108. By determining the network attacker 114 preferences, newly created network decoys may be added to the pool of network decoys 106 that display features or aspects that are more attractive to the network attacker 114, thereby increasing the effectiveness of the pool of network decoys 106. In some aspects, the decoy maintenance module 110 is configured to model preferences of the network attacker 114 based on interactions 118 to generate a preference model of the network attacker 114, which is then used to create new, and more attractive, network decoys. In some implementations, the decoy maintenance module 110 generates the preference model based on observed and/or calculated interaction probabilities that represent a probability that the network attacker 114 will or has interacted with a particular decoy of the pool of network decoys 106.

In other examples, the decoy maintenance module 110 may implement a machine learning technique that is a supervised, unsupervised, or a reinforcement learning technique to derive a preference model of the network attacker 114 based, at least in part on the interactions 118. Examples of supervised learning techniques include K-nearest neighbor (KNN), Naive Bayes, logistic regression, support vector machine (SVM), and others. Other supervised learning analysis techniques include linear or polynomial regression analysis, decision tress analysis, and random forests analysis. Examples of unsupervised learning analysis techniques include association analysis, clustering analysis, dimensionality reduction analysis, hidden Markov model analysis techniques, and others. Examples of clustering analysis techniques include K-means, principal component analysis (PCA), singular value decomposition (SVD), incremental clustering, and probability-based clustering techniques. The reinforcement learning technique may be, for example, a Q-learning analysis technique. The techniques described above are some examples of machine learning techniques that may be utilized by the decoy maintenance module 110 to generate a preference model of the network attacker 114. These are not intended to be limiting.

In addition, as will be described in more detail below, maintaining the pool of network decoys 106 may include evolving the pool of network decoys 106 towards one or more of the learned preferences of the network attacker 114 over several epochs, or iterations. For example, the decoy maintenance module 110 may utilize a metaheuristic procedure inspired by natural selection, genetic, or other evolutionary processes for evolving the pool of network decoys 106. For example, the decoy maintenance module 110 may implement one or more biologically inspired operations such as crossover, mutation and/or selection to evolve the pool of network decoys 106 over several epochs.

Figure 2:
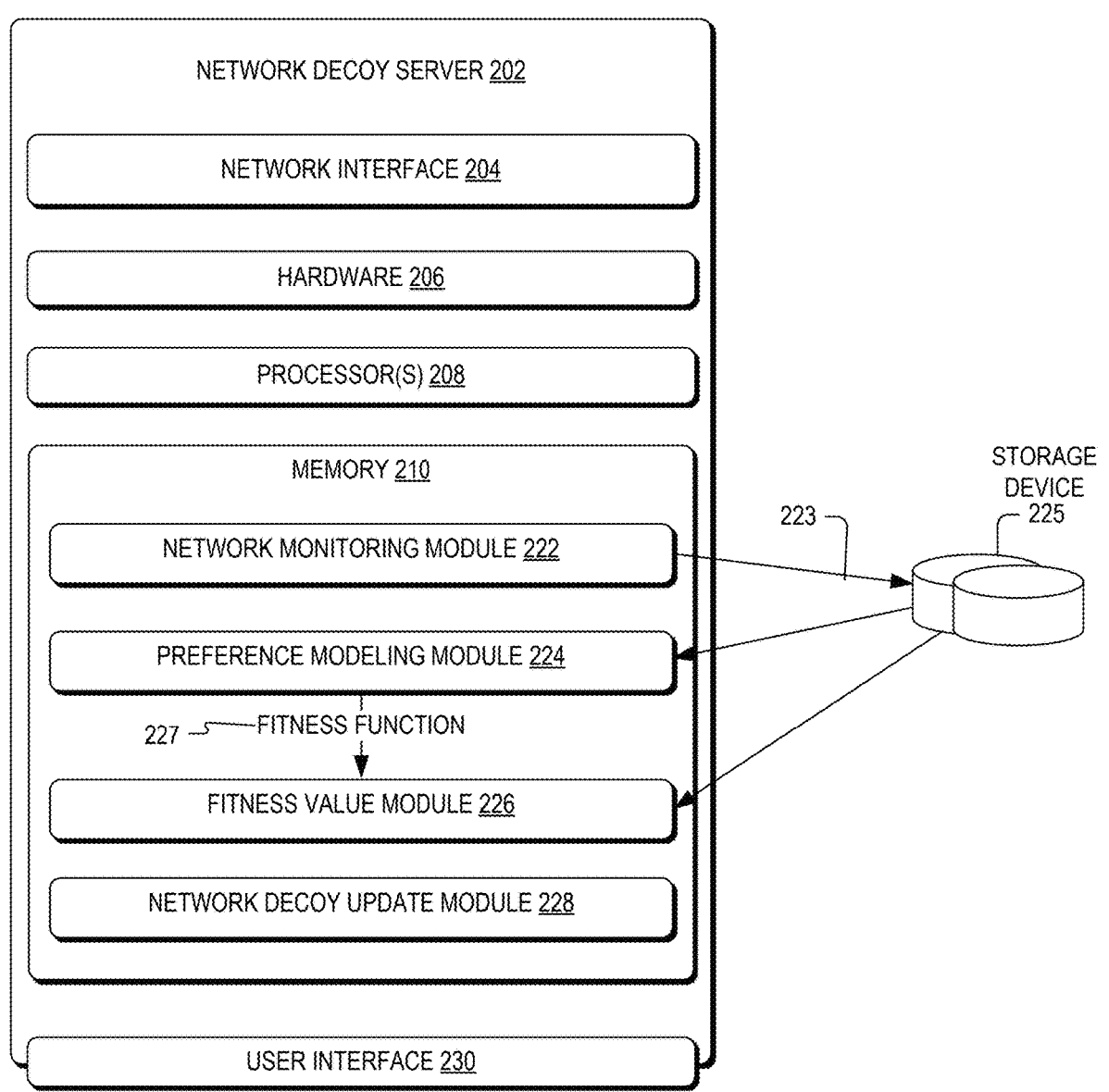
FIG. 2 illustrates an example network decoy server, in accordance with aspects of the disclosure.

FIG. 2 illustrates an example network decoy server 202, in accordance with aspects of the disclosure. Network decoy server 202 is one possible implementation of network decoy server 102 of FIG. 1. Network decoy server 202 is shown as including a network interface 204, hardware 206, a processor 208, a memory 210, and an optional user interface 230. Also shown in FIG. 2 is a data storage device 225 and telemetry data 223.

The network interface 204 may include wireless and/or wired communication components that enable the network decoy server 202 to transmit data to and receive data from other networked devices. This communication may involve, for example, sending and receiving messages, parameters, or other types of information on network 104 of FIG. 1. The hardware 206 may include additional hardware interfaces, data communication, or data storage hardware. For example, the hardware interfaces may include a data output device (e.g., electronic display, audio speakers), and one or more data input devices (e.g., keypads, keyboards, mouse devices, touch screens, microphones, etc.).

The processor 208 of network decoy server 202 may execute instructions and perform tasks under the direction of software components that are stored in memory 210. For example, the memory 210 may store various software components that are executable or accessible by the one or more processors 208 of the network decoy server 202. The various components may include a network monitoring module 222, a preference modeling module 224, a fitness value module 226, and a network decoy update module 228. Network monitoring module 222 is one possible implementation of network monitoring module 108 of FIG. 1. Similarly, the preference modeling module 224, the fitness value module 226, and the network decoy update module 228, collectively, may be one possible implementation of the decoy maintenance module 110 of FIG. 1.

The network monitoring module 222, the preference modeling module 224, the fitness value module 226, and the network decoy update module 228 may include routines, program instructions, objects, and/or data structures that perform particular tasks or implement particular abstract data types. For example, the network monitoring module 222 may include one or more instructions, which when executed by the one or more processors 208 direct the network decoy server 202 to perform operations related to monitoring of interactions 118 of FIG. 1. That is, the network monitoring module 222 may be configured to monitor, observe, and/or receive one or more interactions 118 and save the interactions 118 as telemetry data 223 into one or more storage devices 225. In some aspects, the network monitoring module 222 may be configured to receive (and store in one or more storage devices 225) telemetry data from one or more other servers included in network 104 related to the interactions 118 of the network attacker 114. In one example, the one or more storage devices 225 are included in memory 210 of network decoy server 202. Further details regarding the operation of the network monitoring module 222 and the other modules of the network decoy server 202 will be described below with reference to process 300 of FIG. 3.

Figure 3:
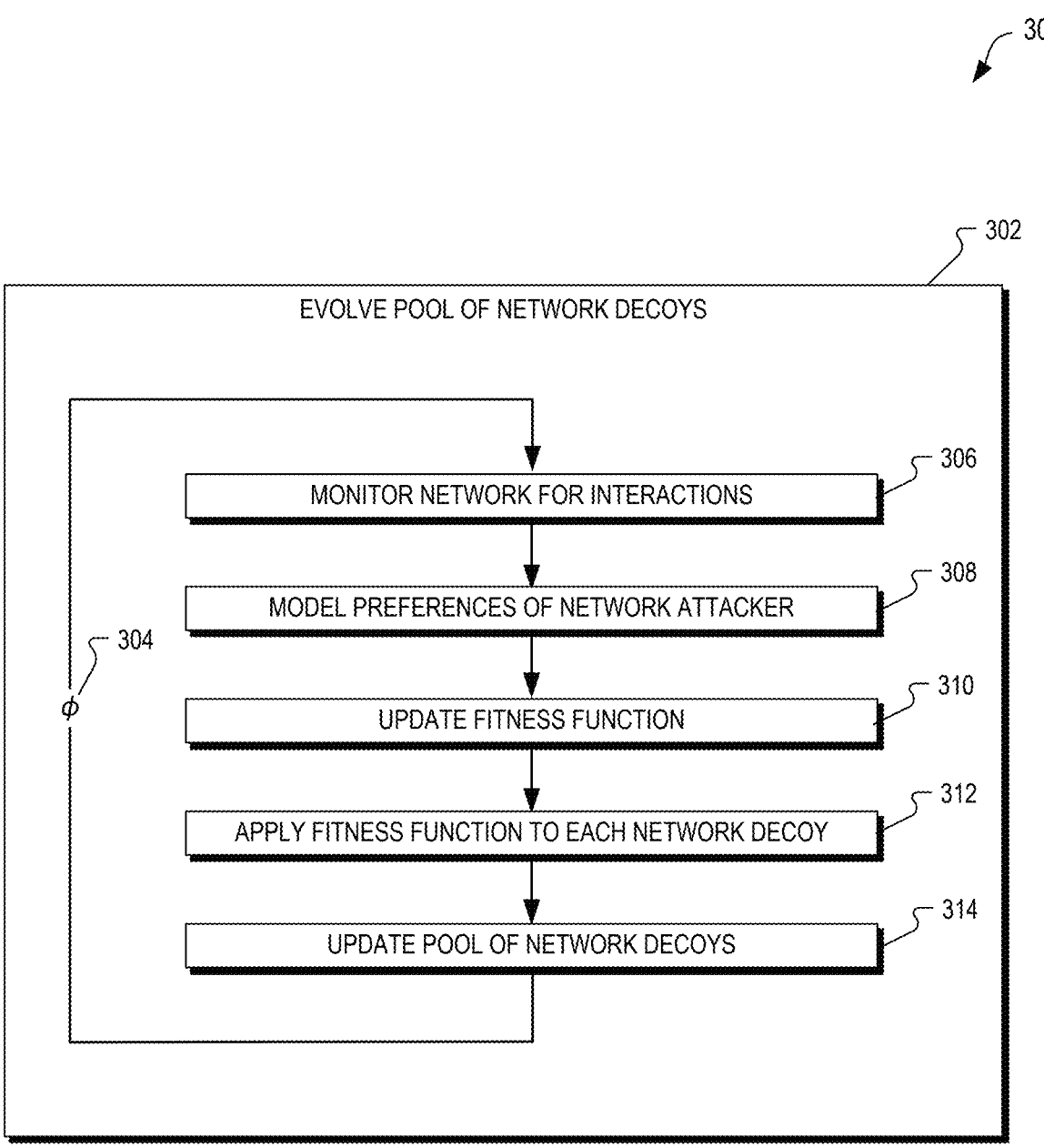
FIG. 3 is a flow diagram of an example process of maintaining a pool of network decoys, in accordance with aspects of the disclosure.

In particular, FIG. 3 is a flow diagram of a process 300 of maintaining a pool of network decoys, such as the pool of network decoys 106 of FIG. 1. Process 300 is one possible process performed by network decoy server 102 of FIG. 1 and/or network decoy server 202 of FIG. 2. As shown in FIG. 3, process block 302 includes the network decoy server 202 evolving, over a plurality of epochs 0 304, the pool of network decoys 106 towards one or more preferences of the network attacker 114. Each epoch 0 304, or iteration, of process block 302, may include a plurality of operations that may be performed concurrently, independently, or consecutively, with reference to each other operation of process block 302. As shown in the illustrated example of FIG. 3, each epoch 0 304, includes operations represented by process blocks 306, 308, 310, 312, and 314, which may be performed one or more times to evolve the pool of network decoys 106 towards one or more preferences of the network attacker 114.

Figure 4:
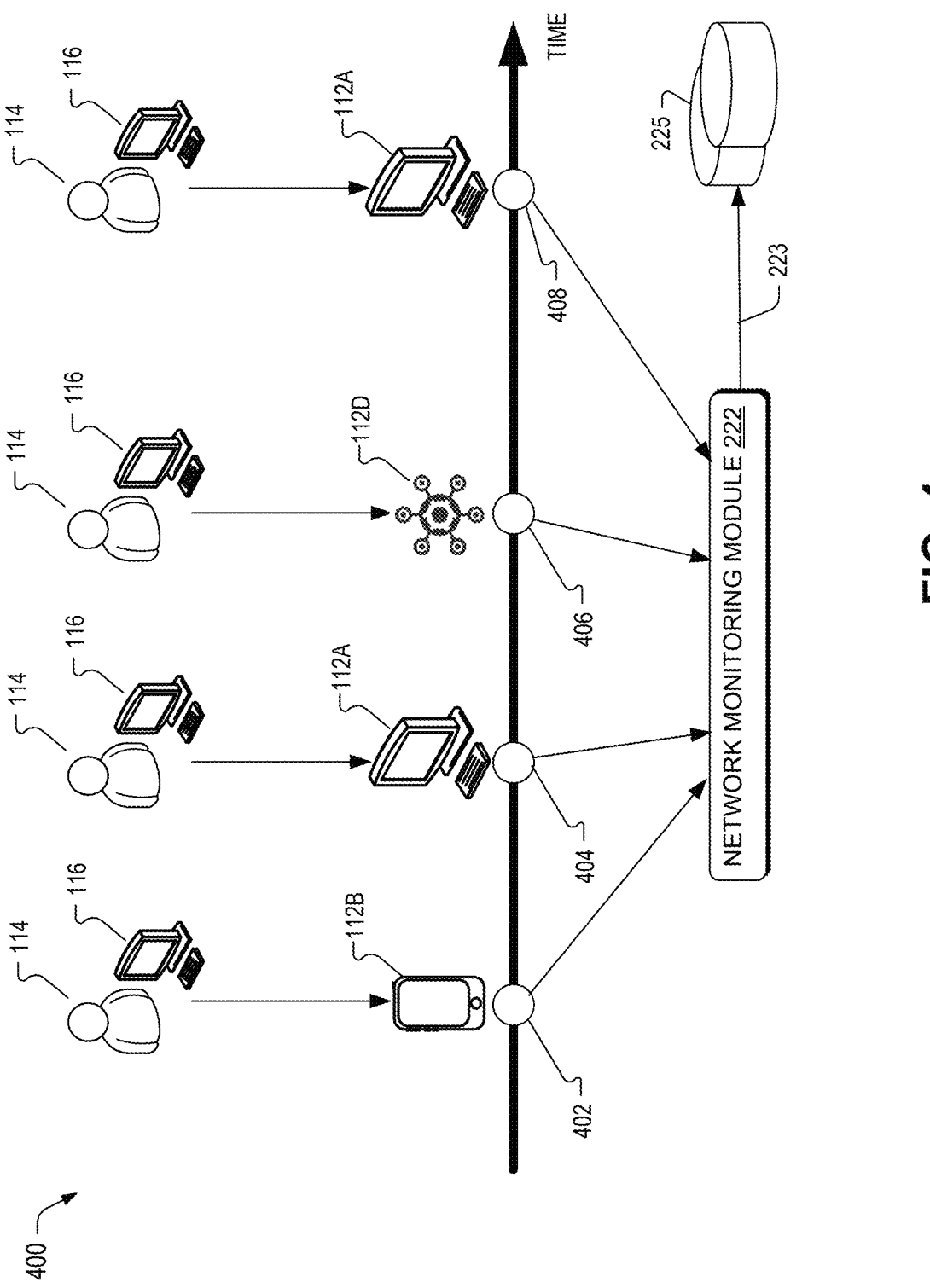
FIG. 4 is a diagram illustrating an example of monitoring and collecting interactions between a network attacker and a pool of network decoys, in accordance with aspects of the disclosure.

In process block 306, the network monitoring module 222 monitors the network 104 for one or more interactions between the network attacker 114 and the pool of network decoys 106. FIG. 4 is a diagram illustrating an example of monitoring and collecting interactions between network attacker 114 and the pool of network decoys 106, in accordance with aspects of the disclosure. Specifically, FIG. 4 illustrates how a network attacker progresses over time and develops a historical (e.g., time-ordered series) of interactions (e.g., interaction events 402-408) with various network decoys.

For example, network attacker 114 (via computing device 116) may interact with network decoy 112B to generate an interaction event 402. Interaction event 402 could possibly be network attacker 114 attempting to access a resource hosted on network decoy 112B. Data collected during interaction event 402 and subsequent interaction events may be detected by the network monitoring module 222, which then stores records of interaction event 402 as telemetry data 223 to the one or more storage devices 225.

As the network attacker 114 progresses over time, telemetry data 223 of subsequent interaction events are also collected by the network monitoring module 222. For example, as shown via interaction event 406, network attacker 114 may later interact with a different network decoy 112D. In one example, interaction event 406 may be network attacker 114 attempting to access a web site at a particular URL hosted by network decoy 112D. In some aspects, the telemetry data 223 collected with respect to a network attacker need not be specific to a particular network decoy or to a particular type of interaction. That is, any definable and observable network activity caused by a network attacker 114 whose parameters may be detected and captured is a candidate for storing as telemetry data 223.

In some aspects, the telemetry data 223 stored in the one or more storage devices 225 includes a record of which network decoy was accessed, as well as the associated configurations of that network decoy. In addition, the telemetry data 223 may include an indication of which services are hosted on the network decoy that the network attacker 114 attempted to access. The telemetry data 223 may further include, for example, associated timing information, such as the duration of the interaction (e.g., how long a service was accessed) and/or a respective time that the interaction occurred.

Returning now to FIG. 3, process block 308 includes the preference modeling module 224 modeling preferences of the network attacker 114 based on the interactions/telemetry data stored in storage device 225. As will be described below, the preference modeling module 224 may generate a preference model of the network attacker 114. In some aspects, the preference model is specific to a particular network attacker 114 and may provide indications as to the relative attractiveness of certain network decoys to the network attacker 114. In addition, in some aspects, each network decoy that is deployed on network 104 may include one or more associated configurations for presenting the network decoy on the network 104. Thus, the preference model may also provide an indication as to the relative attractiveness of various types/values of configurations to that particular network attacker 114.

Figure 5:
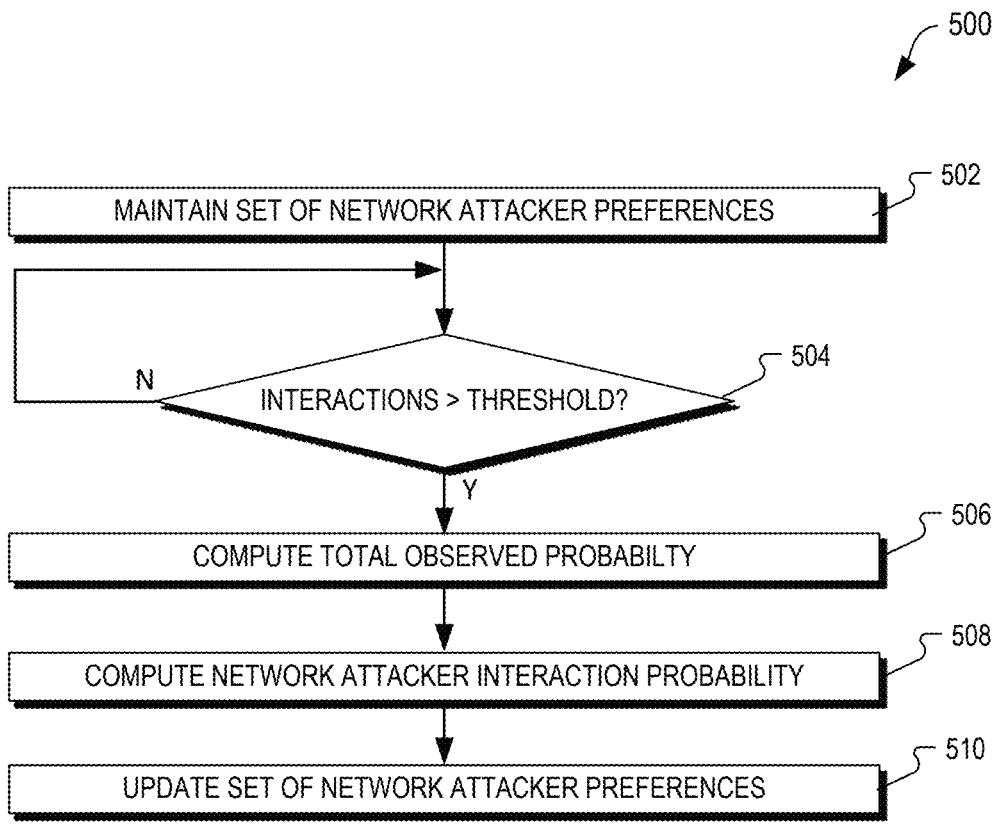
FIG. 5 is a flow diagram of an example process of modeling preferences of a network attacker, in accordance with aspects of the disclosure.

By way of example, FIG. 5 is a flow diagram of an example process 500 of modeling preferences of a network attacker, in accordance with aspects of the disclosure. In some implementations, the preference modeling module 224 of network decoy server 202 is configured to represent each network decoy of the pool of network decoys 106 as a binary vector of length N, according to equation 1 below:

$$N = (1 + M_S M_P)K, \qquad \text{EQ. 1}$$

where $M_S$ is the possible services, $M_P$ is the possible payloads, and K is the possible ports.

In some examples, a decoy vector X is partitioned into K disjoint sets of $(1+M_S M_P)$ components so that X can be written as:

$$\left(X_{1,1}, X_{1,2}, \ldots, X_{1,1+M_S M_P}, X_{2,1}, \ldots, X_{2,1+M_S M_P}, \ldots\right) \qquad \text{EQ. 2}$$

For some implementations, for $j \in \{1, 2, \ldots, K\}$, the vector $(X_{j,1}, X_{j,2}, \ldots, X_{j,1+M_S M_P})$ has a single "1" (one) value. Thus, if $X_{j,1}$ has a "1", then the port is closed. Otherwise, the port is open and the position of the "1" indicates that the service and payload is running on port j.

In one example implementation for the pool of network decoys 106, the number of service types may be set to 30, the number of payloads set to 118, the minimum number of payloads per service may be 1, and the maximum number of payloads per service may be 30. Given this example service/payload data, then the values for $M_S$, $M_P$, K, and N would be as follows: $M_S$=30, $M_P$=30, K=65,535 (e.g., ports 1 to 65535), and N=59,047,035. Thus, in this example, each network decoy is represented as a vector with approximately 59 million elements of 65,535 blocks, where each block has a single "1" value with the remainder of the blocks having "0" values. Such a configuration may result in a sparsity of a particular network decoy feature vector of 99.89%.

Still referring to FIG. 5, in a process block 502, the preference modeling module 224 of network decoy server 202, maintains a set of network attacker preferences. In some examples, the network attacker preferences are modeled as a sparse array of length N, matching the dimensions of the decoy feature vector, described above. For instance, in some implementations, maintaining a set of network attacker preferences includes modeling the preferences as an attacker preference vector according to equation 3 below:

$$\hat{W} = (\hat{w}_1, \ldots, \hat{w}_N) \qquad \text{EQ. 3}$$

In some implementations, the attacker preference vector (e.g., equation 3), is initially set to all zeros for a newly discovered network attacker 114.

Next, in decision block 504, the preference modeling module 224 waits for, or verifies that the network attacker 114 has interacted with the pool of network decoys 106 a threshold number of times. In some aspects, the threshold is a minimum number of interactions 118 by network attacker 114 needed to be able to effectively update the attacker preference vector. In some implementations, the value of the threshold is predetermined. In other implementations, the value of the threshold is dynamically determined and updated during operation. The value of the threshold may be determined empirically, based in part, on a number of suspected attackers on network 104, a degree of their interaction, and/or a total amount of processing power available to the network decoy server. In some examples, determining whether the network attacker 114 has interacted with the pool of network decoys the threshold number of times includes querying, reading, or examining the telemetry data stored in storage device 225.

If the threshold is met, then process 500 proceeds to process block 506, where the preference modeling module 224 computes a total observed probability. In some aspects, the total observed probability is the probability that the network attacker 114 has indeed interacted with a network decoy of the pool of network decoys 106 according to:

$$P_i \text{ for } i \in \{1, 2, \ldots, T\}, \qquad \text{EQ. 4}$$

where T is the total number of network decoys included in the pool of network decoys 106. In some examples, the total observed probability for a particular network decoy is the number of interactions that the network attacker 114 has with that particular network decoy divided by the total number of interactions that the network attacker 114 has across all network decoys of the pool of network decoys 106. Thus, the total observed probability, in some instances, may have a value that is between zero (0) and one (1).

Next, in a process block 508, the preference modeling module 224 computes a network attacker interaction probability. In some aspects, the network attacker interaction probability is a probability that the network attacker will interact with a particular network decoy of the pool of network decoys 106. In some examples, the network attacker interaction probability is calculated based on the set of network attacker preferences (e.g., the attacker preference vector of equation 3, above). By way of example, the network attacker interaction probability that the network attacker 114 interacts with a network decoy i out of T decoys may be calculated according to equation 5, as follows:

$$\hat{p}_i = \frac{\exp(\langle W, x^i \rangle)}{\sum_{i=1}^{T} \exp(\langle W, x^i \rangle)} \text{ for } i \in [T] \qquad \text{EQ. 5}$$

where W is the attacker preference vector (e.g., equation 3), and x is the decoy vector (e.g., equation 2).

Next, in process block 510, the preference modeling module 224 then updates the set of network attacker preferences (e.g., the attacker preference vector of equation 3). In some examples, the network attacker preferences are updated based on both the total observed probability (e.g., equation 4) and the network attacker interaction probability (e.g., equation 5). For example, the attacker preferences may be updated according to equation 6 below:

$$\hat{w}_j = \hat{w}_j + \alpha \sum_{i=1}^{T} x_j^{(i)} (\hat{P}_i - \hat{p}_i) \qquad \text{EQ. 6}$$

Thus, in some aspects, the updated attacker preference vector according to equation 6 is a preference model that indicates a preference of the network attacker 114 for one or more associated configurations included in one or more network decoys of the pool of network decoys 106. In some implementations, the preference modeling module 224 is configured to continuously perform process 500 as the network attacker 114 continues to interact with the pool of network decoys 106 so that the preference model can continuously be updated. In another example, the preference modeling module 224 periodically updates the preference model after a threshold number of new interactions are detected.

Returning now back to FIG. 3, after the modeling of the attacker preferences in process block 308, the preference modeling module 224 updates a fitness function 227 based on the generated preference model (i.e., process block 310). As will be described below, the fitness function 227 is utilized to derive a relative attractiveness (to the network attacker 114) of the network decoys included in the pool, which is then used to update the pool of network decoys 106. Thus, generating or updating a preference model each epoch φ 304 and also updating the fitness function each epoch φ 304 allows the network decoy server 202 to update the pool of network decoys 106 to include network decoys that are more and more attractive as time progresses and as the server learns more and more about the network attacker's preferences.

By way of example, the fitness function 227 may include one or more weights that are applied to a configuration setting or aspect of a network decoy, where updating the fitness function includes adjusting the one or more weights based on the preference model. For instance, the preference modeling module 224 may increase the value of a weight applied to a configuration setting of the network decoy if the preference model indicates that the network attacker 114 prefers that configuration. Similarly, the preference modeling module 224 may decrease the value of the weight if the preference model indicates that the network attacker 114 is not interested, or exhibited low interest in that configuration.

In some implementations, the fitness function 227 may be represented as:

$$T * w_T - L * w_L + D * w_D \qquad \text{EQ. 7}$$

where T is a total number of times that a network decoy was interacted with by the network attacker 114, L is a time since the network decoy was last interacted with by the network attacker 114, and D is a number of services accessed on the network decoy by the network attacker. The $w_T$, $w_L$, and $w_D$ terms are respective weights applied to the T, L, and D values. Thus, in this example, updating the fitness function 227 (e.g., equation 7) may include adjusting one or more of the weights $w_T$, $w_L$, and $w_D$ based on the preference model.

Continuing with process 300 of FIG. 3, in process block 312, the fitness value module 226 then applies the updated fitness function 227 to each network decoy 112A-112G included in the pool of network decoys 106. In some aspects, the fitness function 227 is applied to each network decoy to determine a corresponding fitness value, or score for the network decoys. The fitness value of a network decoy is representative of an attractiveness of that particular network decoy to the network attacker 114. In some implementations, applying the fitness function 227 includes the fitness value module 226 querying, reading, or otherwise obtaining data about a particular network decoy and the network attacker's interactions from the telemetry data 223 contained in storage device 225. For instance, the fitness value module 226 may retrieve the T, L, and D values from storage device 225 for evaluating the example fitness function of equation 7.

US 12,689,657 B2

11 12

Figure 6:
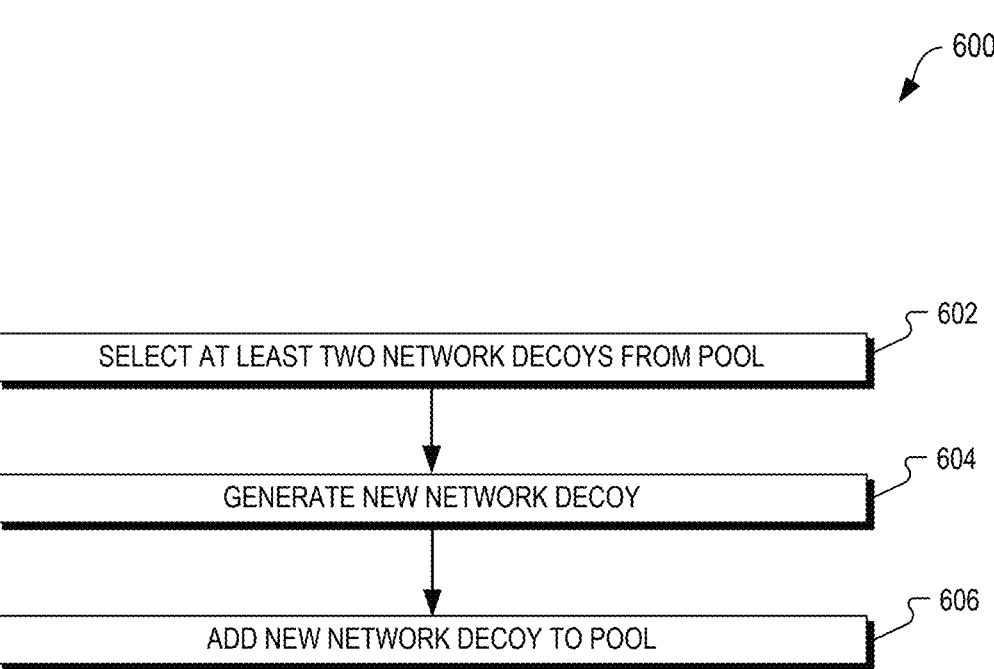
FIG. 6 is a flow diagram of an example process of updating a pool of network decoys, in accordance with aspects of the disclosure.
Figure 7:
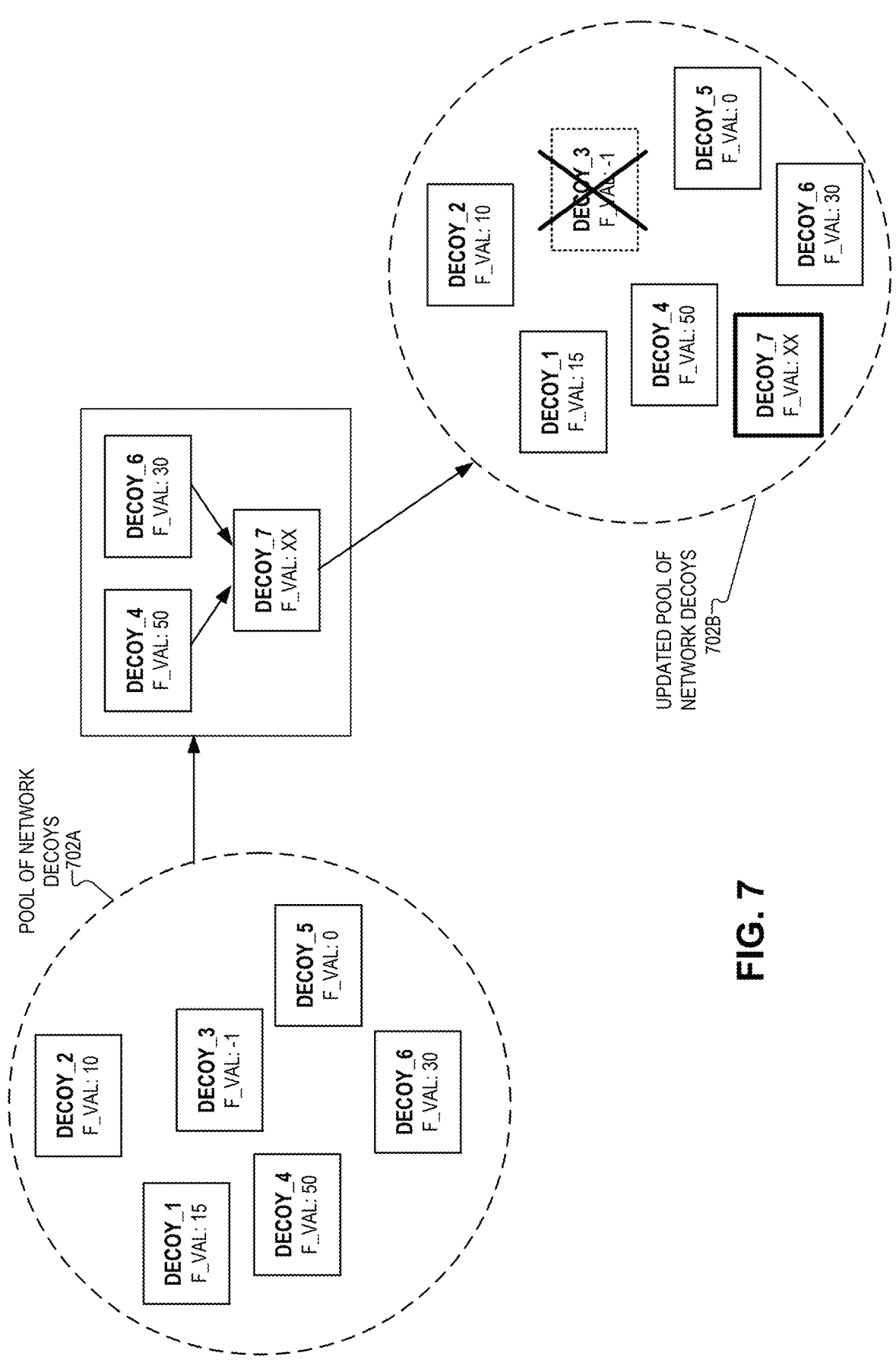
FIG. 7 is a diagram illustrating an example of applying a fitness function to a pool of decoys and updating the pool, in accordance with aspects of the disclosure.

Next, in process block 314, the network decoy update module 228 updates the pool of network decoys 106 based on the fitness values of the network decoys. FIG. 6 is a flow diagram of an example process 600 of updating a pool of network decoys, in accordance with aspects of the disclosure. Process 600 is one possible implementation of process block 314 of FIG. 3. FIG. 7 is a diagram illustrating an example of updating a pool of network decoys, in accordance with aspects of the disclosure. Process 600 will be described with reference to both FIG. 6 and FIG. 7.

FIG. 7 illustrates an example pool of network decoys 702A. Pool of network decoys 702A is shown as including several network decoys (i.e., DECOY_1 to DECOY_6). As shown in FIG. 7, each network decoy has an associated fitness value (shown as F_VAL: XX). The pool of network decoys 702A is one possible implementation of the pool of network decoys 106 of FIG. 1.

In a process block 602, the network decoy update module 228 selects at least two network decoys from the pool of network decoys 702A based on their respective fitness values (e.g., F_VAL). In some examples, selecting the at least two network decoys includes selecting two network decoys from the pool of network decoys 702A having the highest fitness values. Thus, in the illustrated example, DECOY_4 and DECOY_6, have the highest fitness values of 50 and 30, respectively.

Next, in process block 604, the network decoy update module 228 generates a new network decoy. In some examples, the new network decoy is generated based on the two network decoys selected in process block 602. For example, as shown in FIG. 7, a new network decoy DECOY_7 is generated based on both DECOY_4 and DECOY_6. In some aspects, generating the new network decoy includes a crossover operation such that the new network decoy includes configurations that are randomly selected from between configurations of the two "parent" network decoys. Thus, DECOY_7 may include one or more configurations randomly selected from between the configurations of DECOY_4 and DECOY_6. By way of particular example, FIG. 8 is a diagram illustrating the creation of new network decoy DECOY_7.

Figure 8:
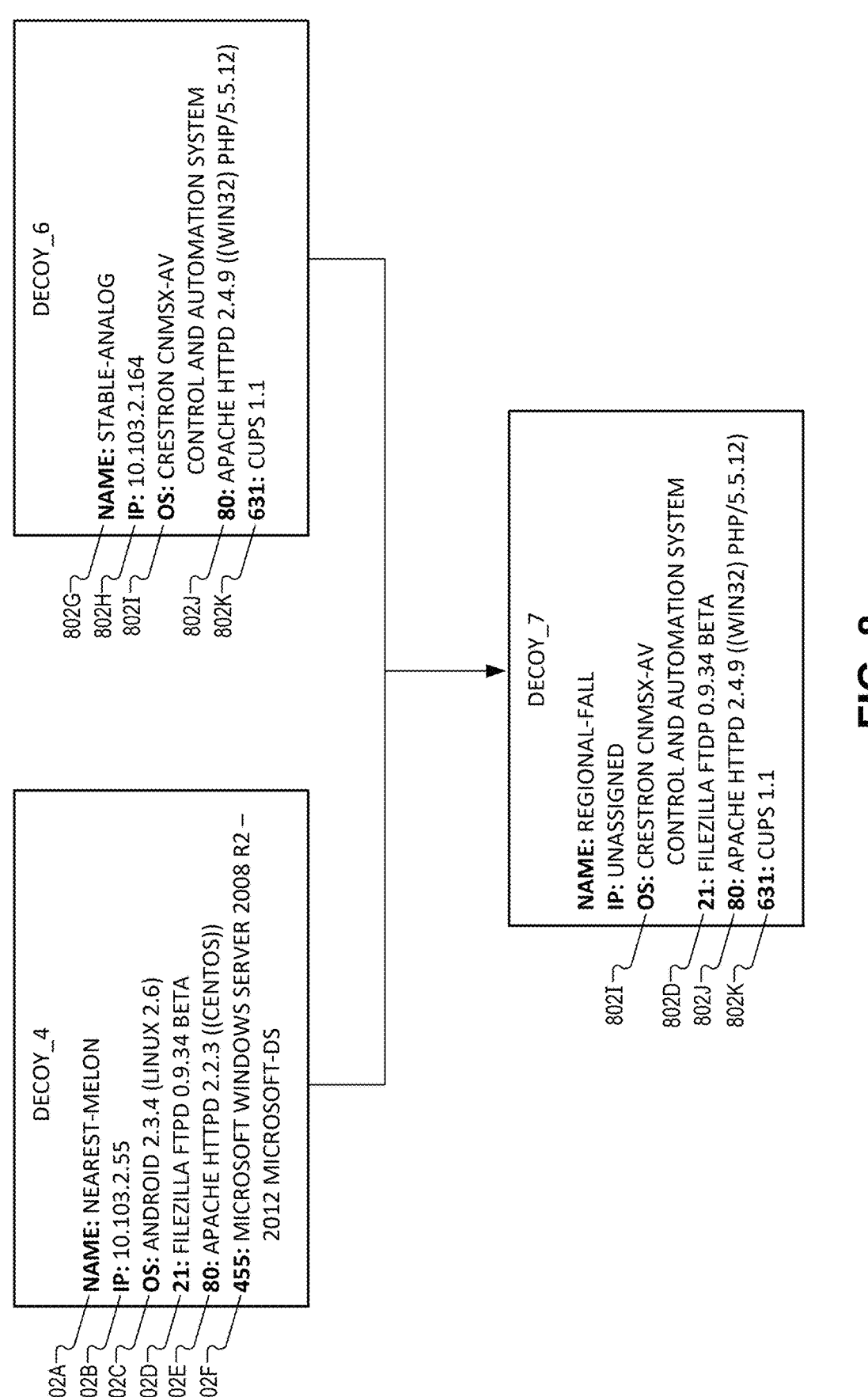
FIG. 8 is a diagram illustrating an example of creating a new network decoy, in accordance with aspects of the disclosure.

As shown in FIG. 8, network decoy DECOY_4 includes a plurality of configurations 802A-802F that are used for presenting DECOY_4 on a network (e.g., network 104 of FIG. 1) as a network device, a network service, or a network resource. Similarly, DECOY_6 is shown as including configurations 802G-802K. As mentioned above, the creation of new network decoy DECOY_7 may involve randomly selecting configurations from between DECOY_4 and DECOY_6 to include in DECOY_7. Thus, FIG. 8 illustrates DECOY_7 as including configuration 802D copied from DECOY_4 and configurations 8021, 802J, and 802K, each copied from DECOY_6.

Figure 9:
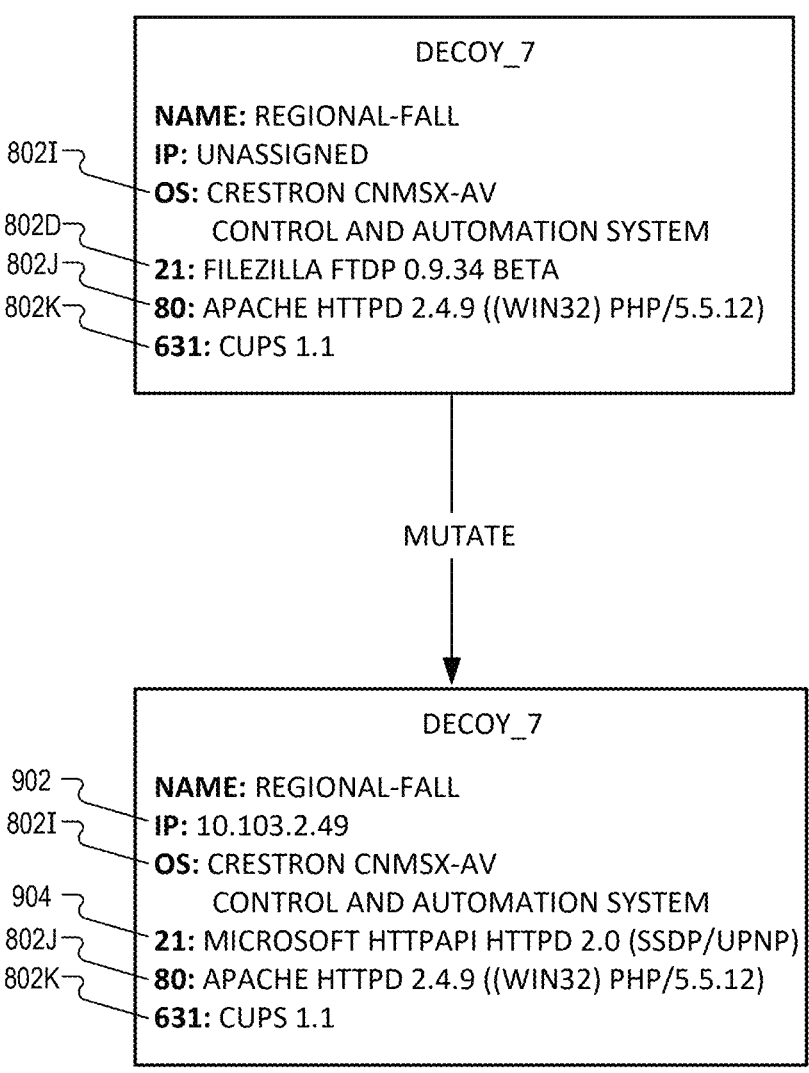
FIG. 9 is a diagram illustrating an example of mutating a new network decoy, in accordance with aspects of the disclosure.

In some aspects, generating a new network decoy includes an optional process of randomly mutating one or more configurations of the new network decoy. For example, FIG. 9 is a diagram illustrating an example of mutating new network decoy DECOY_7, in accordance with aspects of the disclosure. In some examples, mutating a new network decoy, such as DECOY_7, may include randomly assigning one or more network services to the new network decoy. In particular, the network decoy server 202 may maintain a list of possible service/payload combinations and randomly select one or more of them to modify the new network decoy's configuration. In another example, mutating the new network decoy may include randomly selecting a port number for one or more network services assigned to the new network decoy. In yet another example, mutating the new network decoy may include randomly selecting an operating system for the new network decoy. In the illustrated example of FIG. 9, the pre-mutation configuration 802D of DECOY_7 has been changed to a post-mutation configuration 904 (e.g., service available on port 21 has changed from FILEZILLA FTDP . . . to MICROSOFT HTTPAPI . . . ) In addition, the mutated new network decoy DECOY_7 has been randomly assigned a configuration 902 (i.e., IP address).

Returning now to FIGS. 6 and 7, after the new network decoy has been created, process block 606 includes adding the new network decoy DECOY_7 to the pool of network decoys. In the example, of FIG. 7, the updated pool of network decoys 702B now includes DECOY_7. In some aspects, adding a new network decoy to the pool of network decoys includes instantiating, hosting, operating, or otherwise making the new network decoy available on the network (e.g., network 104 of FIG. 1). In some examples, adding the new network decoy to the pool of network decoys includes replacing at least one existing network decoy included in the pool. In some aspects, replacing an existing network decoy includes deleting or removing a network decoy having a lowest fitness value from among the pool of network decoys. By way of example, network decoy DECOY_3 is shown in FIG. 7 as having the lowest fitness value (F_VAL: −1). Thus, DECOY_3 may be removed and not included in the updated pool of network decoys 702B. Accordingly, by removing network decoys with low fitness values and replacing them with newly generated network decoys that are derived from the higher scoring network decoys, the pool of network decoys may evolve, over several epochs, towards one or more preference of the network attacker 114.

The processes, methods, functions, or modules explained above may be implemented in hardware, software, firmware, or any combination thereof. If implemented in software, the techniques may be stored on or transmitted as one or more instructions or code on a computer-readable medium. The techniques described may constitute computer-executable instructions embodied or stored within a tangible or non-transitory computer-readable medium, that when executed by a processor will cause the processor to perform the operations or acts described. Additionally, the processes may be embodied within hardware, such as an application specific integrated circuit ("ASIC") or otherwise.

A tangible non-transitory computer-readable medium includes any mechanism that provides (i.e., stores) information in a form accessible by a machine (e.g., a computer, network device, personal digital assistant, manufacturing tool, any device with a set of one or more processors, etc.). For example, a machine-readable medium may include recordable or non-recordable media (e.g., read only memory (ROM), random access memory (RAM), magnetic disk storage media, optical storage media, flash memory devices, etc.).

In addition, the methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of maintaining a pool of network decoys on a network, the method comprising:

evolving, over a plurality of epochs, the pool of network decoys towards one or more preferences of a network attacker, wherein each epoch includes:

monitoring the network for one or more interactions between the network attacker and the pool of network decoys;

modeling preferences of the network attacker based on the one or more interactions to generate a preference model of the network attacker;

updating a fitness function based on the preference model;

applying the fitness function to each network decoy included in the pool of network decoys to determine a plurality of fitness values, wherein each fitness value is representative of an attractiveness of a respective network decoy to the network attacker; and updating the pool of network decoys based on the plurality of fitness values.

2. The method of claim 1, wherein the fitness function includes one or more weights applied to a respective property of each network decoy, and wherein updating the fitness function comprises:

adjusting the one or more weights based on the preference model.

3. The method of claim 2, wherein monitoring the network for one or more interactions between the network attacker and the network includes:

determining the respective property for each network decoy, wherein the respective property is at least one property selected from the group consisting of: (T) a total number of times that the network decoy was interacted with by the network attacker, (L) a time since the network decoy was last interacted with by the network attacker, and (D) a number of services accessed on the network decoy by the network attacker.

4. The method of claim 3, wherein the fitness function comprises:

$$T * w_T - L * w_L + D * w_D,$$

wherein $w_T$ is a first weight applied to (T), $w_L$ is a second weight applied to (L), and $w_D$ is a third weight applied to (D), and wherein adjusting the one or more weights includes adjusting one or more of $w_T$, $w_L$, or $w_D$.

5. The method of claim 1, wherein each network decoy includes one or more associated configurations for presenting the network decoy on the network as a network device, a network service, or a network resource, and wherein modeling the preferences of the network attacker includes generating the preference model to indicate a preference of the network attacker for the one or more associated configurations.

6. The method of claim 5, wherein updating the fitness function comprises:

determining that a particular network decoy of the pool of network decoys includes the one or more associated configurations preferenced by the network attacker; and if so updating the fitness function to increase the fitness value for the particular network decoy.

7. The method of claim 1, wherein modeling the preferences of the network attacker comprises:

calculating at least one network attacker interaction probability, wherein the network attacker interaction probability is a probability that the network attacker will interact with a particular network decoy of the pool of network decoys; and generating the preference model based on the at least one network attacker interaction probability.

8. The method of claim 1, wherein each network decoy includes one or more associated configurations for presenting the network decoy on the network as a network device, a network service, or a network resource, and wherein modeling the preferences of the network attacker includes:

maintaining a set of network attacker preferences, wherein the set of network attacker preferences indicates at least one configuration of the one or more configurations preferenced by the network attacker;

determining whether the network attacker has interacted a threshold number of times with the pool of network decoys in response to the monitoring of the one or more interactions; and if so, computing a total observed probability that the network attacker has interacted with the particular network decoy of the pool of network decoys based on the one or more interactions;

computing a network attacker interaction probability based, at least in part, on the set of network attacker preferences, wherein the network attacker interaction probability is a probability that the network attacker will interact with the particular network decoy; and updating the set of network attacker preferences based on the total observed probability and the network attacker interaction probability.

9. The method of claim 1, wherein updating the pool of network decoys includes:

selecting at least two network decoys from the pool of network decoys based on the plurality of fitness values;

generating a new network decoy based on the at least two network decoys; and adding the new network decoy to the pool of network decoys.

10. The method of claim 9, wherein adding the new network decoy to the pool of network decoys includes replacing at least one existing network decoy included in the pool of network decoys with the new network decoy.

11. The method of claim 10, wherein the at least one existing network decoy is a network decoy of the pool having a lowest fitness value.

12. The method of claim 9, wherein selecting the at least two network decoys from the pool of network decoys includes selecting two network decoys from the pool of network decoys having the highest fitness values.

13. The method of claim 12, wherein each network decoy includes one or more associated configurations for presenting the network decoy on the network as a network device, a network service, or a network resource, and wherein generating the new network decoy includes generating the new network decoy to include one or more configurations randomly selected from between configurations of the two network decoys with the highest fitness values.

14. The method of claim 9, wherein generating the new network decoy further comprises:

randomly mutating one or more configurations of the new network decoy.

15. The method of claim 14, wherein randomly mutating the one or more configurations comprises:

randomly assigning one or more network services to the new network decoy.

16. The method of claim 15, wherein randomly mutating the one or more configurations further comprises:

randomly selecting a port number for the one or more network services assigned to the new network decoy.

17. A network decoy server, comprising:

a network interface to be communicatively coupled to a network;

at least one processor coupled to the network interface; and at least one memory coupled to the at least one processor, the at least one memory having instructions stored therein, which when executed by the at least one processor, direct the network decoy server to:

maintain a pool of network decoys, wherein each network decoy includes one or more associated configurations for presenting the network decoy on the network as a network device, a network service, or a network resource, wherein the instructions to maintain the pool of network decoys includes instructions to evolve, over a plurality of epochs, the pool of network decoys towards one or more preferences of a network attacker, wherein each epoch includes instructions to direct the network decoy server to:

monitor the network for one or more interactions between the network attacker and the pool of network decoys;

model preferences of the network attacker based on the one or more interactions to generate a preference model of the network attacker;

update a fitness function based on the preference model;

apply the fitness function to each network decoy included in the pool of network decoys to determine a respective plurality of fitness values, wherein each fitness value is representative of an attractiveness of a respective network decoy to the network attacker; and update the pool of network decoys based on the plurality of fitness values.

18. The network decoy server of claim 17, wherein the instructions further direct the network decoy server to:

determine that a particular network decoy of the pool of network decoys includes at least one configuration preferenced by the network attacker; and if so update the fitness function to increase the fitness value for the particular network decoy.

19. One or more non-transitory computer-readable media storing computer-executable instructions that upon execution cause one or more processors to perform acts comprising:

maintain a pool of network decoys, wherein each network decoy includes one or more associated configurations for presenting the network decoy on a network as a network device, a network service, or a network resource, wherein the instructions to maintain the pool of network decoys includes instructions to evolve, over a plurality of epochs, the pool of network decoys towards one or more preferences of a network attacker, wherein each epoch includes instructions to direct the one or more processors to:

monitor the network for one or more interactions between the network attacker and the pool of network decoys;

model preferences of the network attacker based on the one or more interactions to generate a preference model of the network attacker;

update a fitness function based on the preference model;

apply the fitness function to each network decoy included in the pool of network decoys to determine a respective plurality of fitness values, wherein each fitness value is representative of an attractiveness of a respective network decoy to the network attacker; and update the pool of network decoys based on the plurality of fitness values.

20. The one or more non-transitory computer-readable media of claim 19, wherein the instructions further direct the one or more processors to:

determine that a particular network decoy of the pool of network decoys includes at least one configuration preferenced by the network attacker; and if so update the fitness function to increase the fitness value for the particular network decoy.

* * * * *